3,258,316
PREPARATION OF METAL BORIDES
Frederick Tepper, Butler, and John Wilson Mausteller, Evans City, Pa., Ludwig Luft, South Lincoln, Mass., and Sanat Kumar Kabi, Dist. Dhanbad, Bihar, India, assignors to M.S.A. Research Corp., Pittsburgh, Pa., a corporation of Pennsylvania
No Drawing. Filed July 29, 1963, Ser. No. 322,265
(Filed under Rule 47(a) and 35 U.S.C. 116)
21 Claims. (Cl. 23—343)

This invention relates to the process for the preparation of metal borides. More specifically, it relates to the process for the preparation of such borides in a molten metal menstruum comprising sodium, potassium, or mixtures of sodium and potassium. This application is a continuation-in-part of applicant's copending application, Serial No. 23,606, filed April 21, 1960, now abandoned.

The present method of preparing various metal borides results in the production of products having a coarse particle size and containing impurities generally difficult or tedious to remove, which makes the products undesirable for certain purposes.

A number of different processes presently are used for the preparation of metal borides, all of which have disadvantages either in the type of product obtained, or in the difficulty of preparation. Some metal borides are made by melting elemental metal and boron, or by a solid state diffusion or sintering of the elements. These methods give mixtures of borides and since an excess of one element or the other is required to complete the reaction, the excess element is present as an impurity in the product. In some cases, salts containing these desired elements are fused and converted to the metal boride by electrolysis. This method is expensive and gives particles of large size. In another case, mixtures of oxides of the metal and boron are reduced with carbon to give the desired metal boride. High temperatures are required for this type of solid state reaction, and the product is a massive briquette which has to be pulverized.

In certain cases, magnesium, aluminum, or silicon have been used in the molten state to provide a metal menstruum for the production of certain metal borides. Here again the temperatures used, the type of equipment required, and the large particle size of the product are disadvantageous. Again, when molten silicon is used as the reaction menstruum for this purpose, the product contains silica or silicates which are difficult to remove.

In certain vapor phase reactions, such as the reaction of boron trichloride with titanium tetrachloride in the presence of hydrogen to produce titanium boride, the type of equipment and the difficulty of handling the reagents, with the resultant expense, also are disadvantageous. Moreover, some of these processes are limited in the type of borides that can be prepared.

It is an object of this invention to provide a process for the production of metal borides of microcrystalline size.

It is also an object of this invention to provide a process for producing metal borides of high purity or containing only impurities which are removed easily and efficiently.

Another object of this invention is to provide a process for the production of metal borides using a metal menstruum which is relatively non-corrosive to containers such as stainless steels or carbon steel.

Still another object of this invention is to provide a process for the preparation of metal borides in a metal menstruum which is removed easily from the boride product by distillation.

Still another object of this invention is to provide a process for the production of metal borides whereby the boride product can be separated easily from the metal menstruum by filtration.

Still another object of this invention is to provide a process for the preparation of metal borides from which impurities can be removed easily and efficiently.

These and other objects which will be obvious from the following description are accomplished by the present invention, wherein metal borides are formed in and eventually separated in microcrystalline size from a molten metal menstruum comprising sodium, potassium, or a mixture of sodium and potassium. The metal component of the desired metal boride is supplied by the elemental metal or a compound of the metal, such as a metal halide, metal sulfide, metal oxide, etc. The boron component of the boride is supplied by boron or by a boron compound, such as a boron halide, or a boron oxide.

It has been found that the reaction for the production of metal borides in accordance with the present invention preferably are conducted at about 1600° F. or higher, but can be conducted at temperatures as low as 1500° F., and in some particular cases, for example with nickel, even as low as 1200° F. Therefore, stainless steel or carbon steel containers can be used as reactors, whereas previously used metal menstrua and the temperatures required for their use caused such serious corrosion to stainless steel or ferrous metals that it was necessary to use ceramic or graphite containers. These latter materials make it more difficult to control the amount of impurities and also have other obvious disadvantages. Although it is generally not desirable, the reactions also can be conducted at higher temperatures up to the boiling point of the menstruum metal and, where pressure equipment is used, at even higher temperatures. However, there is no beneficial purpose in using excessive temperatures and all the advantages of this invention are obtained with temperatures not exceeding 2000° F.

Furthermore, the low melting points of the metal menstrua used in the present invention (97.5° C. for sodium, 63.4° C. for potassium, and −12° C. for a 22–78 percent mixture of sodium and potassium respectively) permit the separation of the boride particles from the metal menstrua by filtration with stainless steel filtering screens. The relatively low boiling points of sodium (889° C.) and potassium (757° C.) also permit removal of the metal menstrua by distillation. Any sodium or potassium remaining after such distillation or filtration can be removed easily by digestion with methanol.

When the reagent metal is used in elemental form, it can be introduced as a pure metal or as an alloy. In cases where it is desirable to produce a mixture of metal borides, or a mixed metal boride, the appropriate metals can be added as an alloy. However, it is generally advantageous that the metal be introduced as a compound which either is reduced easily by the menstruum metal, or reacts directly and simultaneously with reduction to produce the desired compound.

It is not intended that the invention be restricted to such a theory, but where the reagent metal is produced as an intermediate by reduction with the menstruum metal, it is believed that the reaction proceeds more quickly and more efficiently in such cases due to the nascent condition of the reagent metal and probably the resulting more uniform distribution in the reaction medium. It is also possible, that the reagent compounds react directly without forming elemental metal as an intermediate.

As a source of boron, boron oxides, such as boron oxide ($B_2O_3$) and dehydrated borax ($Na_2B_4O_7$), are used advantageously in the practice of this invention. The various boron halides, e.g. boron trifluoride, boron trichloride, boron tribromide, etc., and boron hydrides, such as diborane, pentaborane, decaborane, etc., also are suitable. While elemental boron also can be used, it is generally preferred to use one of the boron compounds indicated, particularly boron oxide or dehydrated borax, since they are the least expensive. In many cases, the resultant sodium or potassium reduction byproducts, such as sodium halide, hydroxide, or sulfide remains dissolved in the menstruum. In cases where it is precipitated with the boride, it can be removed by washing with water.

The reagent metals that can be used in the practice of this invention are the Group IVA metals, namely titanium, zirconium, and hafnium; the Group VA metals, namely vanadium, columbium, and tantalum; the Group IIIA metals including the rare earths and actinides, namely scandium, yttrium, lanthanum, cerium, praseodymium, neodymium, promethium, samarium, europium, gadolinium, terbium, dysprosium, holmium, erbium, thulium, ytterbium, lutecium, actinium, thorium, protoactinium, uranium, neptunium, plutonium, amaricium, curium, berkelium, and californium; magnesium, calcium, strontium, and barium of Group IIA; and also manganese, iron, nickel and tungsten.

In cases where the reagent metal or the reagent metal compound is difficult to dissolve in the molten alkali metal menstruum, a molten salt flux, such as molten sodium chloride, can be used to aid solution. Where such a flux is not dissolved in the menstruum, such molten salt mixed by agitation with the metal menstruum can be helpful for such purpose. In cases where boron oxide or dehydrated borax is used as the source of boron, these also serve as fluxes.

Metal boride particles produced by the practice of this invention are of a microscrystalline character with an average of less than 10 microns, generally less than 7 microns, in the largest cross-section dimension. The particle size is predominantly in the range of 0.1-5 microns in the largest dimension. This particle size range has many obvious advantages in the uses for which metal borides are desired. This particle size is an improvement over macro-crystalline particles produced by other methods, in which the average particle size is greater than 10 microns and generally is in the range of 30-40 microns or even higher.

Various types of equipment can be used in the practice of this invention which provide a container for the reactants advantageously made of stainless steel or carbon steel, a heat source which includes temperature control and measuring means, and, where desired, means either for filtering through stainless steel screen, or for distillation of the sodium or potassium. Stainless steels of the 304 and 316 varieties have been found suitable. An inert atmosphere, such as argon, helium, etc., is maintained in the reactor. This equipment also can be designed with an outlet means at the bottom whereby the reaction mass can be transferred to a second vessel for subsequent distillation or filtration.

The procedures described in the following examples are conducted in a stainless steel pipe in which the two ends can be closed and the length of pipe is held in a vertical position. The bottom end is equipped with an outlet means, and spaced from the bottom of the pipe is a support for filtering disc described below. When placed in that position the disc will effect close contact with the wall of the reactor and will be located at a distance from the bottom of the pipe equivalent to approximately one-quarter the length of the pipe. A stainless steel stirrer extends into the reaction space through the top of the reactor and through a sealing means adapted to withstand the pressures necessary for filtration.

Also, at the top of the reactor is an inlet means for the various reagents and for the inert atmosphere. This inlet means is also adaptable as an outlet means for sodium or potassium vapors when distillation is to be effected. This same inlet means is also adaptable for the insertion of a filtering tube which is capable of conducting filtration by the application of a pressure differential between the reactor space and the space in the filter tube on the opposite side of the filter disc contained in the filtration tube. The outside of the stainless steel pipe is equipped with a resistance-heating device and a thermocouple is welded on the outside of the pipe at the same level as the reaction zone on the inside of the pipe.

The filter discs mentioned above are sintered micrometallic discs of stainless steel particles. When a filtration is to be performed by a filter disc supported on the means indicated above, the filter disc is placed on the support means before the reagents are added. The microscopic openings in the filter disc are of such small size that even when the alkali metal is in a fluid condition, it does not pass through the disc without the application of pressure on the upper surface of the reaction mass. However, a pressure differential of 5-10 p.s.i. across the filter disc generally is sufficient to effect filtration.

Various methods of practicing the invention are illustrated by the following examples. These examples are intended merely to illustrate the invention and not in any sense to limit the manner in which the invention can be practiced. The parts and percentages therein and all through the specification, unless specifically provided otherwise, refer to parts by weight and percentages by weight.

*Example I*

In the equipment described above, the filter disc is placed on the support means and the equipment swept out above and below the disc with argon. Then 10 parts of titanium dioxide, 60 parts of boron oxide, and 120 parts of sodium are placed on the disc. The equipment is sealed and with an atmosphere of argon maintained, the temperature is raised to 1600° F. (870° C.), the stirrer being started after the sodium has melted. About two hours is required to take the reaction mass to this temperature. The temperature is maintained at 1600° F. (870° C.). The product is filtered at that temperature by applying 5-10 p.s.i. argon pressure above the reaction mass and the sodium filtrate is allowed to run out through the outlet means at the bottom of the equipment. The filter cake is washed with methanol to remove the residual sodium and also any traces of sodium oxide that might be present due to any possible oxygen contamination. The filter cake is washed with methanol to remove the residual sodium and also any traces of sodium oxide that might be present due to any possible oxygen contamination. The filter cake is then removed and broken up, and in ordinary atmosphere added to hot water and then refiltered. A yield of 90 percent of theoretical for $TiB_2$ is obtained. This product is identified by X-ray diffraction pattern, and the chemical analysis of 68.5 percent titanium and 30 percent boron checks closely with theoretical. The average particle size of the product is less than 1.5 microns.

*Example II*

The procedure of Example I is repeated using an equal amount of potassium in place of the sodium. Similar results are obtained.

*Example III*

The procedure of Example I is repeated using an equal amount of a 22 percent sodium and 78 percent potassium mixture. The filtration is conducted at room temperature instead of the temperature used in Example I. The product obtained is similar to that of Example I.

*Example IV*

A mixture of 8 parts titanium dioxide, 30 parts dehydrated borax, and 100 parts of sodium are added to the equipment used in Example I except that the filter disc is not used. The heating procedure of Example I is repeated. Then the reaction mass is cooled to room temperature and the sodium dissolved from the product by digesting with methanol. After the methanol digestion, the methanol solution is run out the bottom outlet in the equipment, the equipment opened, and the solid product removed, broken up, added gradually to hot water, digested and filtered. A product similar to that of Example I is obtained.

Example V

The procedure of Example IV is repeated with the following modifications. The solid reagents (15 parts of dehydrated borax and 100 parts of sodium) are placed in the reactor and while an atmosphere of argon is maintained the temperature is raised to about 750° F. (400° C.). The stirrer is started and 5 parts of titanium tetrachloride is metered slowly through the inlet means into the reactor. After the titanium tetrachloride is all added, the temperature is raised to 1600° F. (870° C.) and held at that temperature for four hours. After processing as in Example IV, a titanium boride product is obtained similar to that of Example I.

Example VI

The procedure of Example IV is repeated using 4 parts of titanium dioxide, 2 parts of boron, and 100 parts of sodium. After processing as in Example IV, a product is obtained corresponding in particle size to that of Example IV, which is identified by X-ray diffraction pattern to be $TiB_2$ in the major phase together with some boron.

Example VII

The procedure of Example IV is repeated using 12 parts of zirconium dioxide, 50 parts of boron oxide, and 150 parts of sodium. A yield of 90 percent of theoretical of zirconium boride ($ZrB_2$) is obtained and identified by X-ray diffraction pattern. The particle size of the product is similar to that of the product of Example I.

Example VIII

The procedure of Example I is repeated using 12 parts zirconium dioxide, 50 parts boron oxide, and 150 parts of a mixture of 22 percent sodium and 78 percent potassium. The reaction product is cooled to room temperature, filtered and processed as in Example I. The product is similar to that obtained in Example VII.

Example IX

The procedure of Example I is repeated using 6 parts of titanium metal having a particle size of approximately 5 microns. The product obtained is similar to that of Example I.

Example X

The procedure of Example IV is repeated using a different titanium compound in each case, i.e., titanium tetrabromide, titanium tetrafluoride, titanium tetraiodide, and titanium sulfide respectively. In each case, results are obtained similar to those of Example IV.

Example XI

The procedure of Example I is repeated using an equivalent amount of hafnium dioxide in place of titanium dioxide. The product is similarly identified as hafnium boride and is similar to that of the Example I product in particle size.

Example XII

The procedure of Example I is repeated using an equivalent weight of hafnium metal of approximately 5 micron particle size in place of the titanium dioxide. The hafnium boride product resembles the product of Example I in particle size.

Example XIII

The procedure of Example V is repeated using an equivalent weight of hafnium tetrachloride in place of the titanium tetrachloride. Results similar to those of Example V are obtained.

Example XIV

The procedure of Example IV is repeated using 5 parts of tantalum pentoxide, 9 parts of boron oxide, and 70 parts of sodium, and the heating period is for 5 hours instead of 4 hours. The product is similar in particle size to that obtained in Example IV and is identified by X-ray diffraction pattern to be TaB in the major phase and also some $TaB_2$.

Example XV

The procedure of Example IV is repeated using 2 parts of vanadium pentoxide, 9 parts of boron oxide, and 70 parts of sodium, with a heating period of 5 hours instead of 4 hours. The vanadium boride product is similar in particle size so that of Example IV. When the procedure is repeated using an equivalent amount of niobium pentoxide in place of the vanadium pentoxide, corresponding results are obtained.

Example XVI

The procedure of Example XV is repeated using an equivalent weight of dehydrated borax in place of the boron oxide. Similar results are obtained.

Example XVII

The procedure of Example XIV is repeated using 5 parts of cerium dioxide, 9 parts of boron oxide, and 75 parts of sodium, and the heating period extended to 4½ hours. The product is identified by X-ray diffraction pattern as $CeB_6$ and has an average particle size of less than 7 microns.

Example XVIII

The procedure of Example XIV is repeated using 4 parts of uranium dioxide, 10 parts of boron oxide, and 75 parts of sodium, and the heating period is extended to 10 hours. The uranium boride product has an average particle size of less than 5 microns.

Example XIX

The procedure of Example I is repeated 20 times using respectively in place of the titanium dioxide, an equivalent amount of a different compound in each case selected from the chlorides of scandium, yttrium, lanthanum, cerium, praseodymium, neodymium, promethium, samarium, europium, gadolinium, terbium, dysprosium, holmium, erbium, thulium, ytterbium, lutecium, actinium, thorium, and uranium. In each case the corresponding boride is obtained in microcrystalline size.

Example XX

The procedure of Example XIX is repeated using an equivalent amount of the corresponding metal oxide, and in place of the boron oxide using an equivalent amount of dehydrated borax. Similar results are obtained.

Example XXI

The procedure of Example I is repeated using 2.5 parts of magnesium, 2.2 parts of boron, and 100 parts of sodium. However, instead of filtering the reaction mass, a vacuum is applied and the sodium is removed by distillation at 1600° F. The distillation residue is treated with methanol, followed by hot water, and then by dilute aqueous hydrochloric acid. The magnesium boride ($MgB_2$) is identified by X-ray diffraction pattern, and the analysis of 45.6 percent magnesium and 47.6 percent boron checks with the theoretical. The average particle size is less than 5 microns.

Example XXIII

The procedure of Example XXI is repeated using 20 parts of magnesium, 6 parts of boron oxide, and 100 parts of sodium. The results obtained are similar to those of Example XXI.

Example XXIV

The procedure of Example XXI is repeated using 2 parts of calcium chloride, 4 parts of calcium carbide, 11 parts of boron oxide, and 100 parts of sodium. The product is microscopic in particle size and is identified as $CaB_6$.

Example XXV

Similar results are obtained when the procedure of Example XXIV is repeated with the calcium carbide omitted.

Example XXVI

The procedure of Example XIV is repeated, using 6.8 parts of strontium oxide, 14 parts of boron oxide, and 75 parts of sodium, using a temperature of 1500° F. and a heating period of 4½ hours. A yield of 20 percent of theoretical is obtained of pure strontium boride ($SrB_6$) having an average particle size of 5 microns. The yield is improved when the procedure is repeated using a reaction temperature of 1600° F.

Example XXVII

Similar results are obtained when the procedure of Example XXVI is repeated using 5 parts of strontium dibromide, 4 parts of boron oxide, and 70 parts of sodium.

Example XXVIII

The procedure of Example XXI is repeated using 8 parts of barium dioxide, 4 parts of boron oxide, and 70 parts of sodium. The barium boride ($BaB_6$) product has microscopic particle size.

Example XXIX

The procedure of Example XXII is repeated using an equivalent amount of microcrystalline beryllium powder instead of magnesium. The beryllium boride product is identified by X-ray diffraction pattern and is of microcrystalline size.

Example XXX

A mixture of 5 parts nickel oxide ($Ni_2O_3$), 10 parts boron oxide, and 70 parts of sodium is placed in the equipment described above and heated under an argon atmosphere for 4 hours at 1200° F. The reaction mass is cooled to room temperature, digested with methanol, and the resultant solid product broken up and added gradually to hot water. The yield of 95 percent of theoretical is obtained and is identified by X-ray diffraction pattern to be nickel boride ($Ni_2B$) with a trace of nickel. The product has an average particle size of less than 5 microns.

Example XXXI

Similar results are obtained when the procedure of Example XXX is repeated using 5 parts of nickel dichloride, 5 parts of boron oxide, and 80 parts of sodium.

Example XXXII

The procedure of Example IV is repeated, using 13 parts of ferric oxide, 26 parts of boron oxide, and 150 parts of sodium, and using a reaction temperature of 1500° F. for a period of four hours. The iron boride product has an average particle size of less than 5 microns.

Example XXXIII

Similar results are obtained when the procedure of Example XXXII is repeated using 10 parts of iron powder, 16 parts of boron oxide, and 100 parts of sodium, with a reaction temperature of 1600° F. for a period of five hours.

Example XXXIV

The procedure of Example IV is repeated using one part tungsten oxide ($WO_3$), 6 parts of boron oxide, and 100 parts of sodium The tungsten boride product is of microcrystalline size.

Example XXXV

Manganese boride of microcrystalline size is obtained by the procedure of Example IV, using 7 parts of manganese dioxide, 12 parts of boron oxide, and 70 parts of sodium.

Example XXXVI

The procedure of Example V is repeated, using 15 parts of dehydrated borax and 100 parts of sodium, and feeding in 22 parts of boron trichloride in the preliminary heating step and then completing as in Example V, following the methanol wash with a water wash. A microcrystalline titanium boride product is obtained.

Example XXXVII

The procedure of Example XXXVI is repeated using an equivalent amount of chromic oxide in place of titanium dioxide, and 11 parts of boron trifluoride in place of the boron trichloride. Microcrystalline chromium boride is obtained.

Example XXXVIII

The procedure of Example IX is repeated with similar results using an equivalent weight of decaborane in place of the boron oxide.

The borides produced according to the practice of this invention are particularly useful in the preparation of dispersion alloys of such refractory borides in metals such as nickel, iron, molybdenum, etc., for use as structural materials capable of maintaining their strength at extremely high temperatures. For use in such dispersion alloys, it is extremely important that the refractory particles be in as fine or small a particle size as possible. For that reason, the extremely small or microcrystalline particles obtained by the practice of this invention are particularly advantageous. The procedures and techniques for preparing such dispersion alloys are those presently used for that purpose.

Many of the borides indicated above can be used as catalysts for various purposes. In such catalytic uses, the increased surface due to the much smaller particle size is a very decided advantage for this purpose.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for the preparation of a metal boride by the step of reacting under inert atmosphere and at a temperature of about 1500°–2000° F., and in the case of nickel at a temperature of about 1200°–2000° F., a metal component selected from the class consisting of metals of the periodic groups IV–A, V–A, III–A including the rare earth and actinide elements, magnesium, calcium, strontium, barium, iron, nickel, chromium, and tungsten, and the halides, sulfides, oxides, and mixed metal oxides thereof, with a boron component selected from the class consisting of elemental boron and the halides, oxides, mixed metal oxides, and hydrides of boron, while said reagents are suspended in a molten alkali metal selected from the class consisting of sodium, potassium, and mixtures of sodium and potassium, and separating said metal boride from said alkali metal.

2. A process of claim 1 in which said boron component is boron oxide.

3. A process of claim 1 in which said boron component is dehydrated borax.

4. A process of claim 1 in which said temperature is approximately 1600° F.

5. A process of claim 1 in which said temperature is at least 1600° F.

6. A process of claim 5 in which said metal component is titanium.

7. A process of claim 5 in which said metal component is zirconium.

8. A process of claim 5 in which said metal component is vanadium.

9. A process of claim 5 in which said metal component is tantalum.

10. A process of claim 5 in which said metal component is hafnium.

11. A process of claim 5 in which said metal component is a titanium oxide.

12. A process of claim 5 in which said metal component is a zirconium oxide.

13. A process of claim 5 in which said metal component is a hafnium oxide.

14. A process of claim 5 in which said metal component is a vanadium oxide.

15. A process of claim 5 in which said metal component is a tantalum oxide.

16. A process of claim 5 in which said metal component is a titanium chloride

17. A process of claim 5 in which said metal component is a zirconium chloride.

18. A process of claim 5 in which said metal component is a hafnium chloride.

19. A process of claim 5 in which said metal component is a vanadium chloride.

20. A process of claim 5 in which said metal component is a tantalum chloride.

21. A process of claim 1 in which said temperature is at least 1200° F. and said metal component is nickel oxide.

References Cited by the Examiner

UNITED STATES PATENTS

| | | | |
|---|---|---|---|
| 2,113,354 | 4/1935 | McKenna | 23—208 |
| 2,124,509 | 7/1938 | McKenna | 23—1 X |
| 3,096,149 | 7/1963 | Gruber | 23—14 |

OTHER REFERENCES

AEC Document ANL-6333, January–March 1961, pp. 74–75.

Kieffer et al., "Zertschrift fur Anorganische and Allegmeine Chemie," Vol. 268, No. 3, pp. 191–200, May 1952.

Schwarzkopf et al., "Refractory Hard Metals," pp. 271–275 (1953).

REUBEN EPSTEIN, *Primary Examiner.*

CARL D. QUARFORTH, *Examiner.*

J. D. VOIGHT, S. TRAUB, *Assistant Examiners.*